United States Patent
Taylor

(10) Patent No.: US 6,945,581 B2
(45) Date of Patent: Sep. 20, 2005

(54) INTEGRAL LIGHTING FOR CONSOLES

(75) Inventor: Eric A. Taylor, Jackson, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/730,442

(22) Filed: Dec. 8, 2003

(65) Prior Publication Data

US 2005/0121932 A1 Jun. 9, 2005

(51) Int. Cl.$^7$ .................................................. B60R 7/00
(52) U.S. Cl. ..................... 296/37.8; 362/155; 362/154; 200/61.76
(58) Field of Search ............................... 296/37.8, 37.7, 296/97.5; 200/61.62, 61.76, 314, 529; 362/155, 362/489, 496, 486, 94, 154, 133, 276, 200; 224/926, 282, 539; 297/188.14, 188.01

(56) References Cited

U.S. PATENT DOCUMENTS

| | | | | |
|---|---|---|---|---|
| 1,906,131 | A | * | 4/1933 | Baylis .......................... 362/94 |
| 2,119,267 | A | * | 5/1938 | Berry ........................... 362/155 |
| 2,164,239 | A | * | 6/1939 | Grayson ....................... 362/94 |
| 2,228,456 | A | * | 1/1941 | Hobbs .......................... 362/155 |
| 2,271,910 | A | * | 2/1942 | Bluemle .................. 200/61.76 |
| 2,626,336 | A | * | 1/1953 | Chute ...................... 200/61.76 |
| 2,648,477 | A | * | 7/1953 | Herterick ................... 362/489 |
| 2,791,677 | A | * | 5/1957 | Brown ....................... 200/61.7 |
| 2,851,585 | A | * | 9/1958 | Glowzinski ................ 362/155 |
| 3,172,981 | A | * | 3/1965 | Loesch ..................... 200/61.78 |
| 3,335,249 | A | * | 8/1967 | De Smidt et al. ........... 200/314 |
| 3,553,448 | A | * | 1/1971 | Davis et al. ................ 362/496 |
| 4,115,723 | A | * | 9/1978 | Byrne et al. ................ 362/488 |
| 4,154,393 | A | * | 5/1979 | Darvishian .................... 232/36 |
| 4,160,887 | A | * | 7/1979 | van Buren, Jr. ............. 362/155 |
| 4,168,411 | A | * | 9/1979 | Peck ........................... 362/155 |
| 4,442,478 | A | * | 4/1984 | Stansbury ................... 362/155 |
| 4,577,262 | A | * | 3/1986 | Buteaux ...................... 362/155 |
| 4,754,376 | A | * | 6/1988 | Winslow ..................... 362/154 |
| 4,755,915 | A | * | 7/1988 | Rogers ........................ 362/155 |
| 4,847,738 | A | * | 7/1989 | Nehl ........................... 362/155 |
| 4,914,545 | A | * | 4/1990 | Price ........................... 362/155 |
| 4,979,083 | A | * | 12/1990 | Takano et al. .............. 362/155 |
| 5,063,276 | A | * | 11/1991 | Woodard ..................... 200/529 |
| 5,246,285 | A | * | 9/1993 | Redburn et al. ............ 362/155 |
| 5,264,670 | A | * | 11/1993 | Leonard .................. 200/61.62 |
| 5,442,530 | A | * | 8/1995 | Viertel et al. .............. 296/97.5 |
| D385,677 | S | * | 10/1997 | Vivirito, Jr. .................. D99/29 |
| 5,813,748 | A | * | 9/1998 | Maxymych ................. 362/154 |
| 5,975,713 | A | * | 11/1999 | Brothers ...................... 362/155 |
| 6,102,548 | A | * | 8/2000 | Mantle et al. .............. 362/155 |
| 6,161,944 | A | * | 12/2000 | Leman ........................ 362/276 |
| 6,203,167 | B1 | * | 3/2001 | Liu et al. ..................... 362/133 |
| 6,499,857 | B1 | * | 12/2002 | Lumley ....................... 362/155 |
| 6,749,319 | B1 | * | 6/2004 | Muse ........................... 362/154 |

\* cited by examiner

Primary Examiner—Kiran B. Patel
(74) Attorney, Agent, or Firm—Bill Panagos

(57) ABSTRACT

An overhead console bin for motor vehicles that allows the interior of the storage bin to be illuminated without illuminating the entire interior of the motor vehicle. This console bin comprises a storage bin, a plunger switch, and at least one lighting source. When the storage bin is opened the plunger switch turns on the at least one lighting source highlighting the interior contents of the storage bin. When the storage bin is in its stowed position, the at least one lighting source is turned off.

11 Claims, 1 Drawing Sheet

INTEGRAL LIGHTING FOR CONSOLES

FIELD OF INVENTION

This invention relates generally to console bins of a motor vehicle. More specifically, this invention relates to lighting the interior of console bins without lighting the whole interior of the motor vehicle.

BACKGROUND OF THE INVENTION

Providing storage by way of console bins in motor vehicles has become very popular in motor vehicles. These console bins allow drivers and/or passengers to store any number of things in them, from garage door openers to sunglasses, in a convenient location so that articles do not get lost or misplaced. Current console bins do not allow illumination of the inside of the console bin so that drivers and/or passengers to see what is in bin. This invention allows for the total illumination of the inside storage compartments within the console bins. The closest known technology to this invention is the technology involved in a vanity pack in visors for motor vehicles.

SUMMARY OF THE INVENTION

This console bin comprises a storage bin, a plunger switch, and at least one lighting source. Briefly, when the storage bin of the console bin is opened, the plunger switch is activated and illuminates at least one lighting source within the storage compartment. When the console bin storage bin is closed the plunger switch is deactivated and the at least one lighting source is turned off.

Accordingly, this invention provides for illumination of the console bin when the storage bin is opened allowing the interior contents of the storage bin to be highlighted without illuminating the entire interior of the motor vehicle. As a result, the console bin not only provides adequate storage for one's personal belongings, but it also highlights the interior of the storage bin so that drivers and/or passengers can easily see what is inside the console once the storage bin is opened without having the entire interior of the motor vehicle illuminated.

This invention will allow users to see instantly what is inside their storage bins whether it is light or dark outside. The light inside this console bin takes the frustration out of searching through the storage bin for something in complete darkness.

DETAILED DESCRIPTION OF THE PREFERRED EMBODIMENT

This invention pertains to a console bin 8, which can be mounted in any location within a motor vehicle. In one embodiment, this console bin 8 will be mounted to the ceiling of the motor vehicle. This console bin 8 can be located in an overhead position that is convenient for either the driver and/or passengers. This console bin 8 can be located near the front portion of the motor vehicle so that the driver and front seat passengers can have access to it. Alternatively, the console bin 8 can be just as easily located in a position convenient for accessing by back seat passengers. Positioning of the console bin 8 depends on consumer desires, whether it be in an overhead position or in a side or floor position.

Figure 1:
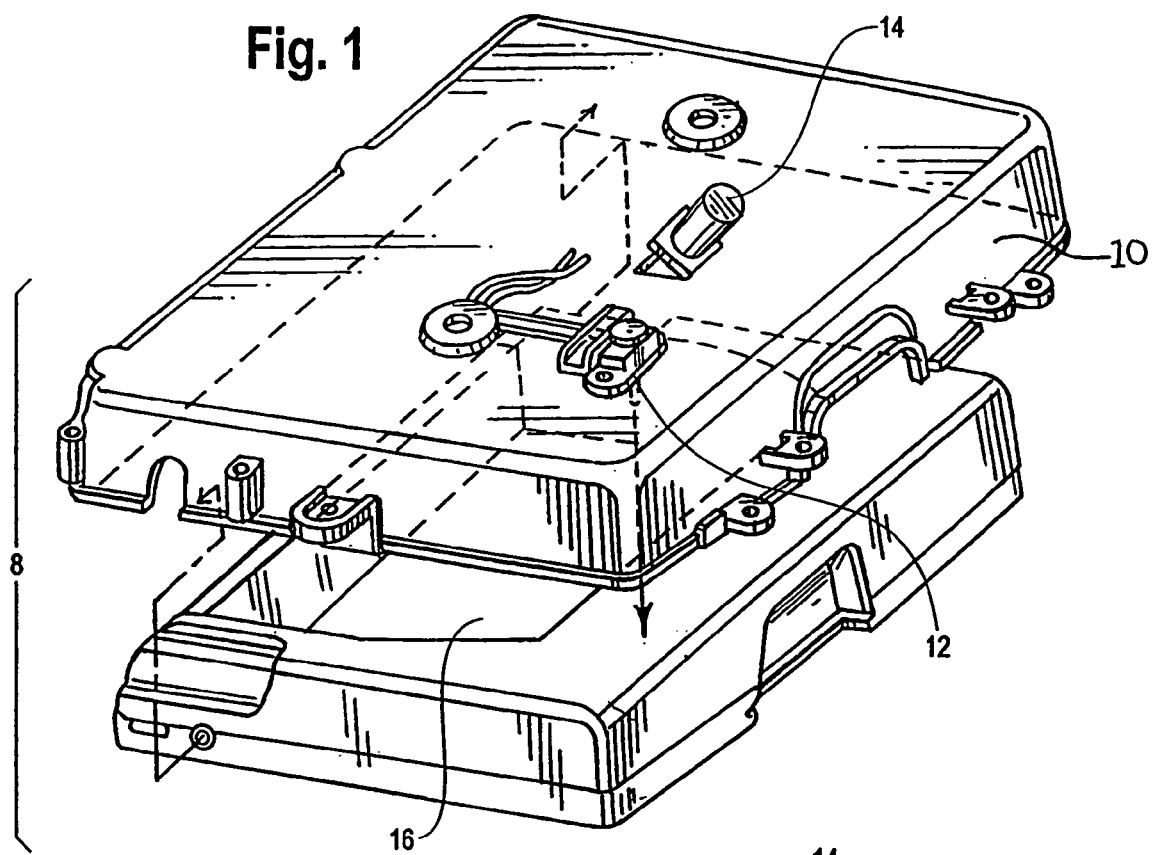
FIG. 1 depicts the console bin in its closed position while still showing all relevant parts.

FIG. 1 depicts a console bin 8 with a separate backplate 10. However, it is possible to have a console bin 8 without a separate backplate 10; they simply have a bin back that is molded in (not pictured). The console bin 8 can be mounted by the backplate 10 or molded in bin back to roof bows (not pictured), the headliner (not pictured), roof brackets (not pictured), side panels (not pictured), etc. Again, mounting positions depend on consumer desires or demand. FIG. 1 depicts the backplate 10 of console bin 8 with the plunger switch 12 and the back end of the at least one lighting source 14. The at least one lighting source 14 is connected to the plunger switch 12.

Figure 2:
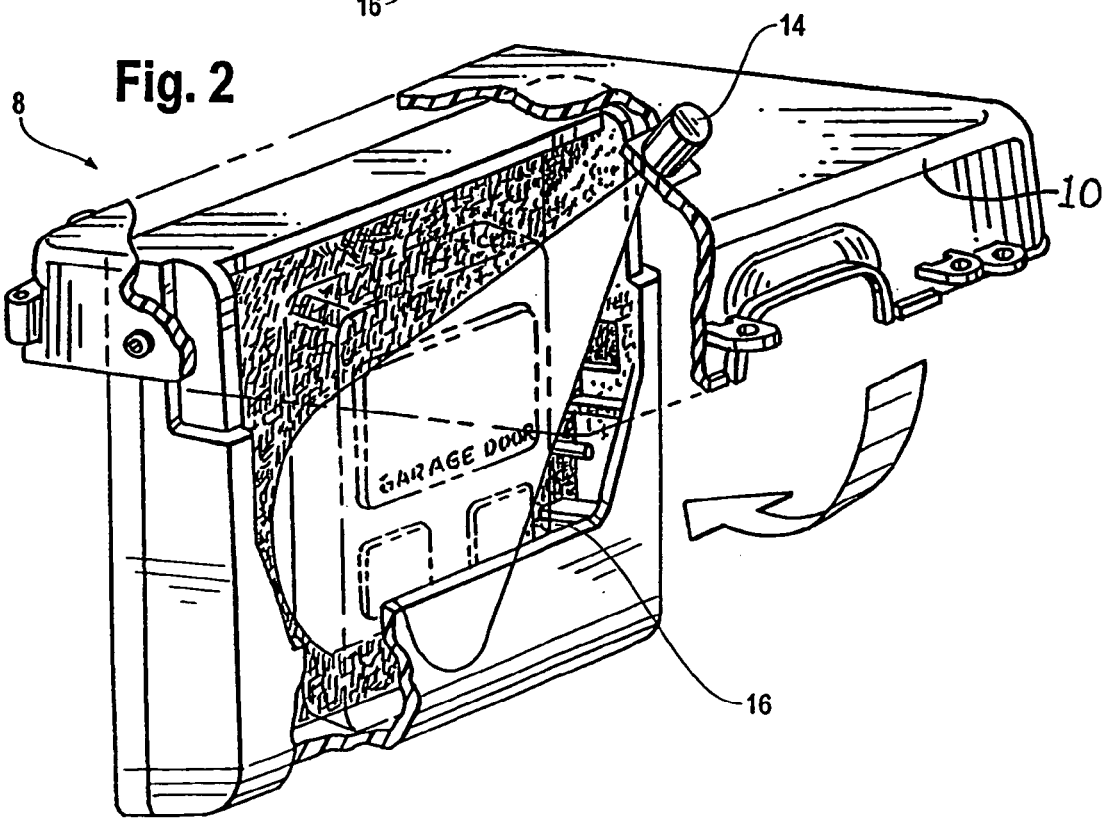
FIG. 2 depicts a console bin in its opened position with the at least one light source illuminating the interior contents.

In its preferred embodiment, the storage bin 16 is pivotally attached to the backplate 10. One's personal belongings can be stored in the storage bin 16. Illumination of the storage bin 16 depends on the movement of the storage bin 16 about its pivotal axis with the backplate 10. When the storage bin 16 is opened, the plunger switch 12 is activated and the at least one lighting source 14 illuminates the storage bin 16. As seen in FIG. 2, the at least one lighting source 14 shines down from the backplate 10 into the now opened storage bin 16. When the storage bin 16 is opened, only the interior contents on that storage bin 16 will be highlighted. Therefore, users can highlight the contents of the storage bin 16 without illuminating the whole interior of the car. As the storage bin 16 closes, the plunger switch 12 turns off the at least one lighting source 14. While the storage bin 16 is closed, the at least one lighting source 14 will remain off.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A console bin for storage of articles in a motor vehicle comprising:
    a backplate;
    a storage bin adapted for holding the articles, said storage bin moveably mounted to said backplate;
    a plunger switch; and
    at least one lighting source fixedly mounted relative to said backplate and operable to illuminate said storage bin when said storage bin moves away from said backplate;
    wherein said backplate includes an opening and said lighting source directs light through said opening into said storage bin when turned on, and
    wherein said plunger switch turns on said lighting source when said storage bin moves away from said backplate so as to illuminate said storage bins and wherein said plunger switch turns off said lighting source when said storage bin moves toward said backplate.

2. The console bin of claim 1, wherein said storage bin is pivotally attached to said backplate.

3. The console bin of claim 1, wherein said plunger switch is located on said backplate of said console bin.

4. The console bin of claim 1, wherein said plunger switch operation is dependant on contact between said storage bin and said plunger switch.

5. The console bin of claim 4, wherein said storage bin is free of contact with said plunger switch when said storage bin moves away from said backplate such that said plunger switch turns on said lighting source to illuminate said console bin.

6. The console bin of claim 4, wherein said storage bin contacts said plunger switch when said storage bin moves toward said backplate such that said plunger switch turns off said lighting source.

7. The console bin as set forth in claim 1 wherein said lighting source directs light primarily only into said storage bin when turned on.

8. The console bin as set forth in claim 1 wherein said storage bin is a hollow container with a plurality of walls and at least one opening formed in at least one of said walls.

9. The console bin as set forth in claim 8 wherein said storage bin includes at least five walls that define a cavity therebetween.

10. The console bin as set forth in claim 1 wherein said storage bin is adapted hang from said backplate when said storage bin moves away from said backplate.

11. The console bin as set forth in claim 10 wherein said storage bin is adapted to hang substantially perpendicularly from said backplate when said storage bin moves away from said backplate.

* * * * *